United States Patent Office 3,290,411
Patented Dec. 6, 1966

3,290,411
METHOD OF MANUFACTURING MODIFIED POLYESTERS HAVING GOOD DYEABILITY
Takaakira Tsuji, Kanji Matsubayashi, Chihiro Sugie, and Kenichi Tanabe, Kurashiki, Japan, assignors to Kurashiki Rayon Company Limited, Kurashiki, Japan, a corporation of Japan
No Drawing. Filed May 22, 1963, Ser. No. 282,244
Claims priority, application Japan, May 30, 1962, 37/22,008; June 19, 1962, 37/25,306
7 Claims. (Cl. 260—873)

The present invention relates to a method of manufacturing improved polyesters.

An object of the invention is to produce modified polyesters which can be formed into filaments or fibers and other shaped articles having considerably improved dyeability with respect to various kinds of dyestuffs, such as disperse dyes, cation dyes, and the like, when compared with unmodified polyesters, yet having substantially the same mechanical properties and heat resistance.

It has been well known that linear polyesters can be synthesized by heating and condensing dihydric alcohols or derivatives thereof and dicarboxylic acids or derivatives thereof, or oxycarboxylic acids or derivatives thereof. For instance, polyethylene terephthalate can be synthesized by the condensation polymerization of ethylene glycol and terephthalic acid. Filaments or other shaped articles made from a linear polyester such as polyethylene terephthalate have very low affinity to dyestuffs so that they are very difficult to dye to a dense color unless special means for dyeing are taken, such as the addition of a so-called carrier as an addition agent to the dyeing bath, or dyeing at a high temperature under pressure.

A further object of the invention is to provide a method of producing a polycondensation product which can be easily dyed without addition of an addition agent to the dyeing bath and without using a dyeing bath at a high temperature and under pressure, the polycondensation product being a modified polyester of excellent dye affinity.

In accordance with the invention, polymers or copolymers of acrylic acid esters or of methacrylic acid esters, or of other unsaturated carboxylic acid esters, are added to the polyester reaction system before the polyester formation has been completed.

Polyesters such as polyethylene terephthalates are usually synthesized by heating dihydric alcohols and dicarboxylic acids or derivatives thereof in the presence of a catalyst to effect ester interchange, then heating at a higher temperature under a reduced pressure to effect polycondensation. The modifying agent in accordance with the invention, i.e. the unsaturated carboxylic acid ester, is added to the reaction system before the synthesis of the polyester is completed, yet in order to carry out the polyester reaction smoothly and uniformly it is preferable to add the modifier after the ester interchange but before polycondensation. In this manner, the added polymer is uniformly dissolved in the polyester or the polycondensation is promoted smoothly with the polymer in uniformly dispersed condition. If the ester interchange is effected by adding, for instance, a polymer containing an acrylic acid ester as the monomer, such as styrene methyl acrylate copolymer, to the polyester reaction raw material mixture suitable for producing polyethylene terephthalate, that is, dimethyl terephthalate, ethylene glycol and a catalyst, then the ester inerchange reaction is suppressed and the generation of methanol caused by the ester interchange occurs with difficulty and unreacted dimethyl terephthalate may remain. On the contrary, when the modifier is added after the ester interchange, it dissolves easily and uniformly in the ester interchange reaction mixture upon heating and agitation so that the polycondensation reaction can proceed very easily in conventional manner. Further, if a polymer containing a methacrylic acid ester as the monomer, such as a copolymer of styrene methyl methacrylate, is added to the reaction system before the ester interchange it does not dissolve in the raw material mixture but causes phase separation. Generally, the solubility becomes better at a high temperature but the ester interchange reaction would not proceed favorably under these conditions. If, on the contrary, the modifier is added after the ester interchange reaction, it easily dissolves in the ester interchange reaction mixture and the polycondensation proceeds very favorably in conventional manner. Moreover, a homopolymer of methyl methacrylate does not completely dissolve in the ester interchange reaction mixture and is liable to cause phase separation, but when the modifier is added by agitating in the ester interchange reaction mixture of reduced viscosity and dispersed, then the polycondensation can be effected without causing phase separation by gradually increasing the viscosity of the reaction system, uniform modified polyesters being produced.

If a polymer containing as the monomer a monomer having a carboxyl group such as acrylic acid, methacrylic acid, maleic acid, fumaric acid and crotonic acid, is added to the synthetic reaction system of polyesters, cross-linked polyesters are produced by the reaction of the carboxyl group, but in case of the polymers of acrylic acid esters or methacrylic acid esters and other unsaturated carboxylic acid esters according to the invention, and particularly in the case of copolymers with another monomer, such as styrene, the reactivity is supressed and it is possible to produce easily spinnable or mouldable polyesters.

Particularly in the case of methacrylic acid esters, the reactivity of the ester group is considerably suppressed by the effect of the methyl group, thereby easily providing linear polyesters. Moreover, by regulating the quantity of acrylic acid esters, polyesters having suitable branched or bridge structure can be produced. The presence of unsaturated carboxylic acid esters such as acrylic acid esters or methacrylic acid esters, is an important factor for improving the solubility and miscibility in polyesters. For instance, a homopolymer of polystyrene has no solubility in polyesters at high temperatures, but the copolymer of styrene containing more than 10% by weight of methyl acrylate or methyl methacrylate and the copolymer of styrene with dimethyl maleate uniformly and transparently dissolve at 280° C. A copolymer with a suitable monomer also has the effect of increasing the solubility in the reaction system, in addition to the effect of suppressing the reactivity of the above-described ester group. For instance, in the case of polyethylene terephthalate, the homopolymer of methyl methacrylate does not show perfect solubility but if it is copolymerized with styrene it can be uniformly dissolved in polyesters. When the degree of polymerization of the polymer to be added becomes substantially high, it becomes difficult to dissolve under the condition of the polyester reaction and, even if dissolved, it has a tendency to make uniform mixing and dissolution difficult due to the high viscosity. Thus, it is generally desirable to use a polymer having a degree of polymerization higher than 5 but less than 5,000. Such polymers usually have a hydroxy group or a carboxyl group or a group easily convertible to such a group at the end, and provide polymers chemically compounded with the polyester.

Unsaturated carboxylic acid esters, including acrylic acid esters and methacrylic acid esters suitably used in the invention are methyl acrylate, ethyl acrylate, n-propyl acrylate, i-propyl acrylate, n-butyl acrylate or methyl methacrylate, ethyl methacrylate, n-propyl methacrylate, i-propyl methacrylate, n-butyl methacrylate, and β-diethylaminoethyl methacrylate, maleic acid esters such as dimethyl maleate and diethyl maleate, fumaric acid esters such as dimethyl fumarate and diethyl fumarate, and other unsaturated acid esters such as dimethyl crotonate, dimethyl isocrotonate, vinyl methyl acetate, dimethyl itaconate, dimethyl citraconate, and methyl cinnamate. As the monomer to be copolymerized with such unsaturated carboxylic acid esters including acrylic acid esters and methacrylic acid esters, any copolymerizable monomer may be used, e.g. vinyl hydrocarbons and their derivatives such as styrene, α-methylstyrene, o, m, or p-methylstyrene, o, m, or p-chlorostyrene, p-methoxy styrene, p-styrene sulfonic acid, or alkali salts thereof, and vinyl naphthalene, and ethylenically unsaturated acids or esters and their derivatives such as methyl α-chloroacrylate, vinyl acetate, vinyl methyl ether, acrylic acids, methacrylic acids, or salts thereof.

As polyesters to be modified use is made of generally linear polyesters, i.e., polyesters of dihydric alcohols or derivatives thereof and dicarboxylic acids or derivatives thereof and polyesters of oxycarboxylic acids or derivatives thereof, or such polyesters modified by various copolymers or other substances, for instance, those modified by a branching agent such as pentaerythritol. As examples of suitable polyesters are the polyester from ethylene glycol and terephthalic acid, ethylene glycol and terephthalic acid, and copolymerized polyesters from terephthalic acid and isophthalic acid, polyesters from 1,4-cyclohexane dimethanol and terephthalic acid, and polyesters from para β-hydroxy-ethoxy-benzoic acid.

The modifier can be added to the polyester raw material mixture to be modified before ester interchange, as above described, but in order to carry out the polyester reaction smoothly and uniformly it is preferable to add the modifier after the ester interchange and before the polycondensation. The preparation of the polyester to be modified can be effected entirely in conventional manner, that is, the raw material for the polyester synthesis is heated to high temperatures in the presence or absence of a catalyst to effect ester interchange and then is heated under reduced pressure to effect polycondensation.

The amount of polymer or copolymer of unsaturated carboxylic acid esters, such as acrylic acid esters and methacrylic acid esters to be used in accordance with the invention can be 0.2 to 30% by weight based on the weight of the acid component of the polyester to be modified, and more preferably 0.5 to 20%. The modified polyesters of the invention can be used for the manufacture of filaments or fibers, films and other shaped articles, and coating materials.

The nature and features of the invention will be further apparent from the following specific examples of practical application. However, it will be understood that these examples are not to be construed as limiting the scope of the present invention in any manner. In the examples, all parts are by weight unless otherwise indicated.

*Example 1*

Methyl acrylate (hereinafter referred to as MA) was polymerized by conventional solution polymerization by using benzoyl peroxide as catalyst and acetic acid as solvent and there was obtained a homopolymer of MA having an intrinsic viscosity $[\eta]$ of 0.30 (dl./g.) measured at 30° C. in benzene. Similarly, copolymers of styrene (hereinafter referred to as St) and MA were prepared by using carbon tetrachloride and dioxane as solvent. Then a polyester raw material mixture composed of 15 g. of dimethyl terephthalate, 15 g. of ethylene glycol and, as catalyst, 0.05% by weight of zinc acetate and 0.025% of antimony oxide based on the dimethyl terephthalate, was heated at 170 to 190° C. for 3 hours and then at 240 to 250° C. for ½ hour by introducing nitrogen to effect ester interchange. At this point, 10% by weight of the homopolymer and of the copolymers obtained as above described, based on the dimethyl terephthalate, were added to separate portions of the polyester raw material mixture and the several samples were heated under a reduced pressure of 20 to 30 mm. Hg at a temperature of from 260 to 280° C. for ½ hour and then under a pressure of 1 mm. Hg at 280° C. for 6 hours to effect polycondensation. When the mixture containing the homopolymer of MA is heated under a pressure of 20 to 30 mm. Hg, the ester group reacted to produce insoluble and infusible cross-linked polyesters within 5 minutes, but the copolymers with St provided soluble and fusible polyesters having substantially linear molecular structure, as shown in Table 1.

TABLE 1

| No. | Added polymer | | State of polymer condensation | Produced polyester | |
|---|---|---|---|---|---|
| | Wt. of raw material monomer (percent) | $[\eta]$ dl./g. (30° C. benzene) | | $[\eta]$* (dl./g.) | Melting point (° C.) |
| 1 | St 100+MA 0 | 0.080 | Undissolved uniformly dispersed. | 0.51 | 254–256 |
| 2 | St 99+MA 1 | 0.075 | ___do___ | 0.55 | 253–257 |
| 3 | St 97+MA 3 | 0.047 | ___do___ | 0.54 | 253–258 |
| 4 | St 90+MA 10 | 0.082 | Dissolved clearly | 0.61 | 256–261 |
| 5 | St 80+MA 20 | 0.090 | ___do___ | 0.58 | 250–258 |
| 6 | St 50+MA 50 | 0.100 | ___do___ | 0.64 | 250–254 |

*Intrinsic viscosity measured at 30° C. in a mixed solvent consisting of 40 parts by weight of tetrachloroethane and 60 parts by weight of phenol.

The polyester No. 5 (added polymer, monomer weight percent, St 80+MA 20) the polycondensation of which resulted in the formation of a clear solution, and polyethylene terephthalate, taken for comparison, were dyed, after being crushed into a powder, in an aqueous solution containing 4% by weight, based on the polycondensation product, of the disperse dye, Diacelliton Fast Brilliant Blue BF, at 98° C. for 2 hours. The polycondensate consisting of polyethylene terephthalate only and not containing the modifier of the invention was dyed to a light colour, while the polycondensate of the invention was dyed to a deep blue color.

The above-described polycondensate were melt-spun to form filaments in conventional manner and the filaments were stretched to about five times their length when extruded and they showed a dry tenacity of 4.0 to 4.6 g./d. and an elongation of 30 to 34%. The filaments were dyed under the same conditions as the above described crushed powders. The filaments consisting of polyethylene terephthalate alone and not containing a modifier of the invention were colored only a little, whereas the filaments of the invention were dyed to a deep color and showed a dye absorption of 35 (mg./g. filament) and very good fastness to sun light, as well as good washing resistance.

*Example 2*

A homopolymer of methyl methacrylate (hereinafter referred to as MMA) and copolymers of MMA with St were produced by solution polymerization using carbon tetrachloride and dioxane as solvents in the manner described in Example 1. A polyester raw material mixture as in Example 1 was subjected to ester interchange in the manner described in Example 1 and afterwards the homopolymer of MMA and the copolymers with St were added to dimethyl telephthalate at the rate of 10% by weight of dimethyl telephthalate and polycondensation was effected in the manner described in Example 1 and there were obtained soluble and fusible polyesters having a substantially linear molecular structure, as shown in Table 2.

The polyester No. 5 (added polymer monomer weight percent St 80+MMA 20) the polycondensation of which proceeded to the clearly dissolved condition was made as filaments in the manner set forth in Example 1 and then the filaments were dyed and showed a dye absorption of 32 (mg./g. filament) and were dyed to a deep clear color.

polymerization using carbon tetrachloride and dimethyl sulfoxide as solvents. After 0.2% by weight of pentaerythritol, based on the dimethyl terephthalate, was added to a polyester raw material mixture having the same composition as that of Example 1, and after the ester interchange reaction, 20% by weight of the copolymer, based on the dimethyl terephthalate, were added to the reaction mixture and heated under a reduced pressure of 20 to 30 mm. Hg at a temperature of 260 to 280° C. for ½ hour and then under a pressure of 1 mm. Hg at 280° C. for 5 hours. There was obtained an easily dyeable polycondensation product melting at 251 to 256° C. and having an intrinsic viscosity of 0.57.

Example 6

A copolymer consisting of 50% by weight of St and 50% by weight of dimethyl maleate was prepared by

TABLE 2

| No. | Added polymer | | State of polymer condensation | Produced polyester | |
|---|---|---|---|---|---|
| | Wt. of raw material monomer (percent) | $[\eta]$ dl./g. (30° C. benzene) | | $[\eta]$ (dl./g.) | Melting point (° C.) |
| 1 | St 100+MMA 0 | 0.080 | Undissolved uniformly dispersed. | 0.51 | 254–256 |
| 2 | St 99+MMA 1 | 0.085 | ___do___ | 0.54 | 243–257 |
| 3 | St 97+MMA 3 | 0.060 | ___do___ | 0.55 | 254–260 |
| 4 | St 90+MMA 10 | 0.090 | Dissolved clearly | 0.61 | 256–262 |
| 5 | St 80+MMA 20 | 0.083 | ___do___ | 0.61 | 254–260 |
| 6 | St 50+MMA 50 | 0.100 | ___do___ | 0.63 | 252–256 |
| 7 | St 0+MMA 100 | 0.078 | Undissolved uniformly dispersed. | 0.52 | 254–255 |

Example 3

A copolymer of 75% by weight of St, 20% by weight of MA and 5% by weight of SSK (potassium styrenesulfonate) was prepared using carbon tetrachloride and dimethyl sulfoxide as solvents. The polyester raw material mixture containing 8 parts by weight of dimethyl terephthalate, 2 parts by weight of dimethyl isophthalate, ethylene glycol and catalysts described in Example 1 was subjected to ester interchanged. Subsequently, 5% by weight of the copolymer, based on the acids present, were added and polycondensed in the manner of Example 1, to yield polycondensation products which fused at 205 to 212° C. and had an intrinsic viscosity of 0.57. The polycondensate was made into filaments in conventional manner as described in Example 1 and the filaments were dyed with a disperse dye as in Example 1. The dye absorption was 33 (mg./g. filament), and a dye absorption of 26 (mg./g. filament) was obtained by dyeing in a dyeing bath containing 3% of the cation dyestuff "Sevron Brilliant Red B" based on the weight of the filaments, at 98° C. for 2 hours.

Example 4

A copolymer consisting of 50% by weight of St, 20% by weight of α-methylstyrene and 30% by weight of ethyl acrylate was produced by solution polymerization with carbon tetrachloride as the solvent. A polyester raw material mixture containing 15 g. of dimethyl terephthalate, 22.2 g. of 1,4-cyclohexane dimethanol and, as a catalyst, 0.5 ml. of an n-butanol solution of 15% tetrabutyl titanate·sodium butylate complex was ester interchanged. Afterwards, 2% by weight of the copolymer, based on the dimethyl terephthalate, were added to the reaction mixture and heated under a reduced pressure of 20 to 30 mm. Hg at 260 to 280° C. for ½ hour, and then under less than 1 mm. Hg pressure at 305° C. for 2 hours. There was thus obtained an easily dyeable polycondensate melting at 281 to 288° C. and having an intrinsic viscosity of 0.61.

Example 5

A copolymer consisting of 70% by weight of St, 27% by weight of ethyl methacrylate and 3% by weight of potassium styrenesulfonate was produced by solution polymerization using carbon tetrachloride as a solvent with benzoyl peroxide as catalyst. The copolymer showed an intrinsic viscosity of 0.056 (dl./g.) measured at 30° C. in benzene. Then a polyester raw material mixture containing 15 g. of dimethyl terephthalate, 15 g. of ethylene glycol, 0.05% by weight of zinc acetate and 0.025% by weight of antimony oxide, based on the weight of the dimethyl terephthalate, as catalyst, was ester interchanged by heating at 240 to 250° C. for ½ hour. Afterwards, 10% by weight of the copolymer, based on the dimethyl terephthalate, were added to the reaction mixture and heated under a reduced pressure of 20 to 30 mm. Hg at a temperature of 260 to 280° C. for ½ hour and then under a pressure of 1 mm. Hg at 250° C. for 5 hours to effect polycondensation, which proceeded under a uniform and transparent dissolved condition and yielded a polycondensate having an intrinsic viscosity of 0.60 (dl./g.) measured at 30° C. in a mixed solution consisting of 40 parts by weight of tetrachloroethane and 60 parts by weight of phenol, and a melting point of 253 to 257° C.

The polycondensate thus obtained was melt-spun in conventional manner and the filaments produced were stretched about 5 times their length when extruded. These filaments showed a dry tenacity of 4.2 to 4.4 (g./d.) and an elongation of 29 to 33%. The filaments were dyed in an aqueous solution containing 4% of the disperse dye Diacelliton Fast Brilliant BF, based on the weight of the filaments, at 98° C. for 2 hours to a dense color showing a dye absorption of 37 (mg./g. filament). In contrast, the filaments consisting of polyethylene terephthalate alone and not containing the modifier of the invention were dyed very little. The fastness against sun-light and the washing resistance of the dyed product of the invention were excellent.

Example 7

A copolymer consisting of 60% by weight of St and 40% by weight of dimethyl fumarate having an intrinsic viscosity of 0.08 dl./g. (benzene 30° C.) was produced by solution polymerization using carbon tetrachloride as a solvent. The polyester raw material mixture of Example 1 was subjected to the ester interchange reaction in the same manner as in Example 1, and then 7% by weight of the copolymer, based on the dimethyl terephthalate, were added to the reaction mixture and heated under a reduced pressure of 20 to 30 mm. Hg at 260 to 280° C. for ½ hour and then under a pressure of 1 mm. Hg at 280° C. for 6 hours. There was produced an easily dyeable polycondensation product melting at 252 to 256° C. and having an intrinsic viscosity of 0.58.

*Example 8*

A copolymer consisting of 80% by weight of styrene and 20% by weight of methyl cinnamate was prepared by solution polymerization using carbon tetrachloride as the solvent. Then, after a polyester synthetic raw material mixture containing 15 g. of dimethyl terephthalate, 22.2 g. of 1,4-cyclohexane dimethanol, and, as catalysts, 0.5 ml. of solution of 15% of tetrabutyl titanate·sodium butylate complex dissolved in n-butanol, was ester interchanged, 3% by weight of the copolymer, based on the dimethyl terephthalate, were added to the reaction mixture and heated under a reduced pressure of 20 to 30 mm. Hg at 260 to 280° C. for ½ hour, and then under a pressure of 1 mm. Hg at 305° C. for 2 hours. There was obtained an easily dyeable polycondensate melting at 280 to 286° C. and having an intrinsic viscosity of 0.59.

The conditions and the relative relationships set forth in the examples are those preferred in carrying out the process of this invention, but it will be understood that other conditions and relationships may be used within the scope of the invention. In general, unless otherwise indicated, conventional operations and techniques are suitably employed.

Thus, the formation of polyesters is carried out in conventional manner.

If desired, the modified polyester product is processed into shaped forms in accordance with conventional techniques used in the polyester art. Thus, to form fibers, the products are spun in conventional manner, e.g. by extruding a solution of the product through small holes in a spinning head into a medium effective to remove solvent therefrom.

It will also be understood that various changes and modifications in addition to those indicated above may be made in the embodiments herein described without departing from the scope of the invention as defined in the appended claims. It is intended, therefore, that all matter contained in the foregoing description shall be interpreted as illustrative only and not as limitative of the invention.

We claim:
1. A method of manufacturing modified linear fiber forming polyester polycondensation products of a saturated dicarboxylic acid and dihydric alcohol which consists essentially of forming an ester interchange reaction product of the dicarboxylic acid and dihydric alcohol, thereafter admixing thereinto a modifier selected from the group consisting of addition polymers of unsaturated carboxylic acid esters and addition copolymers of unsaturated carboxylic acid esters with other unsaturated carboxylic acid esters, with unsaturated carboxylic acids, and with vinyl aromatic compounds, the copolymers with vinyl aromatic compounds having at least 10% by weight based on monomer proportions of the unsaturated carboxylic acid ester, said modifier having a degree of polymerization of from 5–5000 and being employed in an amount of 0.2–30.0% by weight based on the weight of saturated dicarboxylic acid, then effecting polycondensation of the ester interchange reaction product mixture.

2. A method as defined in claim 1, wherein said modifier is an ester of acrylic acid.

3. A method as defined in claim 1, wherein said modifier is an ester of methacrylic acid.

4. A method as in claim 1 wherein the dicarboxylic acid is selected from the group consisting of terephthalic acid, isophthalic acid and β-hydroxyethoxy benzoic acid.

5. A method as in claim 1 wherein the unsaturated carboxylic acid ester is an ester of an acid selected from the group consisting of acrylic acid, methacrylic acid, crotonic acid, vinyl acetic acid, cinnamic acid, itaconic acid, maleic acid, fumaric acid and citraconic acid.

6. A modified polyester manufactured by a method as claimed in claim 1.

7. A fiber, film and other shaped article of a modified polyester as claimed in claim 6.

References Cited by the Examiner
UNITED STATES PATENTS

| | | | |
|---|---|---|---|
| 2,996,475 | 8/1961 | Joyner et al. | 260—873 |
| 3,066,113 | 11/1962 | Arnold | 260—873 |
| 3,156,743 | 11/1964 | Coover et al. | 260—897 |

MURRAY TILLMAN, *Primary Examiner.*

SAMUEL H. BLECH, *Examiner.*

J. T. GOOLKASIAN, *Assistant Examiner.*